(12) United States Patent
Wust

(10) Patent No.: US 9,680,936 B2
(45) Date of Patent: Jun. 13, 2017

(54) RAIL SYSTEMS MARK-UP LANGUAGE

(71) Applicant: 4 TEL PTY LTD, Yeppoon (AU)

(72) Inventor: Derel Wust, Yeppoon (AU)

(73) Assignee: 4 TEL PTY LTD, Yeppoon (AU)

( * ) Notice: Subject to any disclaimer, the term of this patent is extended or adjusted under 35 U.S.C. 154(b) by 0 days.

(21) Appl. No.: 14/827,951

(22) Filed: Aug. 17, 2015

(65) Prior Publication Data

US 2016/0260330 A1    Sep. 8, 2016

(30) Foreign Application Priority Data

Mar. 3, 2015    (AU) .................................. 2015100253

(51) Int. Cl.
| | |
|---|---|
| *H04L 29/08* | (2006.01) |
| *B61L 27/00* | (2006.01) |
| *B61L 15/00* | (2006.01) |
| *G06F 17/30* | (2006.01) |
| *B61L 25/00* | (2006.01) |

(52) U.S. Cl.
CPC .......... *H04L 67/12* (2013.01); *B61L 15/0072* (2013.01); *B61L 27/00* (2013.01); *B61L 27/0027* (2013.01); *B61L 27/0055* (2013.01); *B61L 27/0077* (2013.01); *G06F 17/30908* (2013.01); *B61L 25/00* (2013.01)

(58) Field of Classification Search
CPC .. G06Q 10/06313; G06Q 10/06; G06Q 30/02; H04L 41/022; H04L 41/0233; H04L 67/12; H04L 67/125; H04L 43/0823; B61L 19/06; B61L 25/08; B61L 27/00; B61L 27/0055; B61L 27/0027; B61L 27/0066; B61L 27/0077; G06F 17/30908; G06F 17/30911
See application file for complete search history.

(56) References Cited

U.S. PATENT DOCUMENTS

| | | | | |
|---|---|---|---|---|
| 7,543,224 | B2 * | 6/2009 | Schwartz | G06Q 10/06 715/234 |
| 2004/0093196 | A1 * | 5/2004 | Hawthorne | H04L 67/12 703/8 |
| 2005/0021709 | A1 * | 1/2005 | Canali | H04L 41/022 709/223 |
| 2007/0106434 | A1 * | 5/2007 | Galbraith, II | B61L 25/08 701/19 |
| 2011/0117873 | A1 | 5/2011 | Daly et al. | |

(Continued)

OTHER PUBLICATIONS

NSW Government, Australia, "Signalling Control Systems Interface Requirements", Version 2.0, Aug. 18, 2014, Accessed: http://www.asa.transport.nsw.gov.au/sites/default/files/asa/asa-standards/archive/t-hr-sc-01251-sp-v2.0.pdf.*

(Continued)

*Primary Examiner* — Ramy M Osman
(74) *Attorney, Agent, or Firm* — DeLio, Peterson & Curcio LLC; David R. Pegnataro

(57) ABSTRACT

A train control operation system, the system comprising a data collection server for collecting data relating to one or more elements of trains, a network for distributing data relating to the elements to subscribers and a subscription server for hosting definitions of elements which is accessible by subscribers of the system, so as to enable each subscribers to access the definitions from a single source.

17 Claims, 1 Drawing Sheet

(56) References Cited

U.S. PATENT DOCUMENTS

| | | | | |
|---|---|---|---|---|
| 2012/0234986 | A1* | 9/2012 | Rio | B61L 27/0055 |
| | | | | 246/1 R |
| 2012/0290412 | A1* | 11/2012 | Marovets | G06Q 30/02 |
| | | | | 705/14.73 |
| 2013/0095864 | A1* | 4/2013 | Marovets | H04L 51/08 |
| | | | | 455/466 |
| 2014/0172490 | A1* | 6/2014 | Snyder | G06Q 10/06313 |
| | | | | 705/7.23 |
| 2016/0260330 | A1* | 9/2016 | Wust | G06F 17/30908 |
| 2016/0272228 | A1* | 9/2016 | LeFebvre | H04L 67/12 |

OTHER PUBLICATIONS ccord@infrastructure.railml.org, "Infrastructure", Accessed on May 16, 2016: http://www.railml.org/en/user/subschemes/infrastructure.html.*

International Union of Railways, "Rail TopoModel and railML", Sep. 17, 2013, accessed: http://www.uic.org/IMG/pdf/160913_erimworkgroup_presentationerimpresentationparis170913.pdf.*

Wikipedia, "railML", accessed: https://en.wikipedia.org/wiki/RailML.*

Wikipedia, "AIXM", accessed May 16, 2016: https://en.wikipedia.org/wiki/AIXM.*

NSW Government, Australia, "Signalling Control Systems Interface Requirements", Version 1.0, May 7, 2014, Accessed from: http://asa.transport.nsw.gov.au/sites/default/files/asa/asa-standards/archive/t-hr-sc-01251-sp-v1.0.pdf.*

International Union of Railways, "Rail TopoModel and raiolML", ERIM Conference, Sep. 17, 2013, Accessed from: http://www.uic.org/IMG/pdf/160913_erimworkgroup_presentationerimpresentationparis170913.pdf.*

XML, From Wikipedia, the free encyclopedia [retrieved from internet on Jul. 28, 2015] URL:https://en.wikipedia.org/wiki/XML.

Transport for NSW, Specification "Signalling Control Systems Interface Requirements", Issued Date: Aug. 18, 2014, [retrieved from internet on Jul. 28, 2015] <URL: http://www.asa.transport.nsw.gov.au/sites/default/files/asa/asa-standards/t-hr-sc-01251-sp.pdf> published on Nov. 26, 2014 as per Wayback Machine.

* cited by examiner

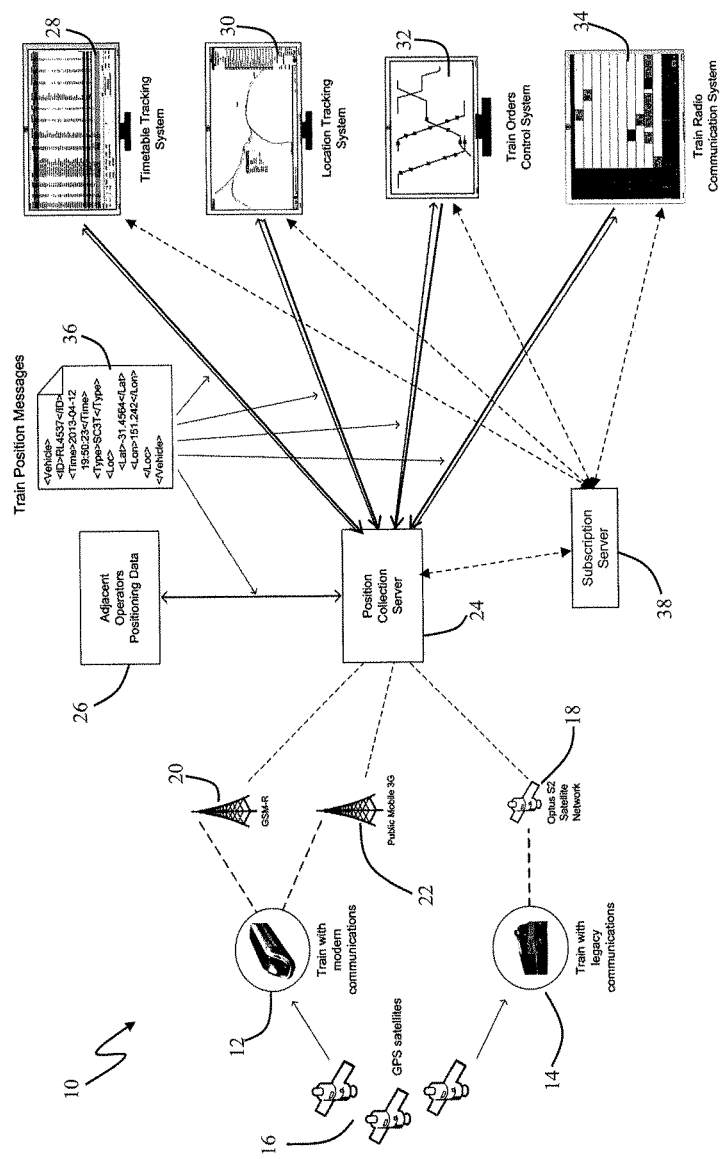

RAIL SYSTEMS MARK-UP LANGUAGE

TECHNICAL FIELD

The present invention relates to a structured means of describing data for use on railway control and safety systems.

BACKGROUND

In order to enable two computers to communicate, both computers must be able to communicate in a common interface language. A common example of such an interface language is the Hyper-Text Mark-up Language (HTML). This is commonly used on web browsers. All modern computers with a web-browser can interpret HTML, but they may not necessarily be able display the data on any particular device due to varying screen sizes and hardware performance limitations.

For this reason, the Extensible Markup Language (XML) has become more popular than HTML because it allows the data content to be separated from how the data is displayed on a browser. XML is "a meta-language", meaning that until a data set is defined, the language itself only provides the rules for the creation of a specific mark-up language.

Another interface language is the Extensible Hyper-Text Mark-up Language (XHTML) which is used for interfacing data to web browsers on smartphones and tablets. The XHTML provides the rules for different devices (having different size and performance characteristics) to adapt webpages for those particular devices. For example, when a web browser on a mobile telephone receives the data it has to render the webpage differently to how it would be rendered on a desktop computer or tablet computer.

Computer systems also are used to operate railway networks. Those computers may be used to compute many aspects of the operation of the railway. For example, they may be required to track the current location of any particular locomotive or access timetables of where the locomotives should be and when they should be there (to determine whether a locomotive is operating on time). The computer systems operating the railway networks also require an interface language.

Each computer recipient of the data needs rules on how to interpret that data, so that the information is processed correctly. Multiple computers may need similar but slightly different data. For example, one computer may require time or location to be defined with two decimal points (e.g. 10.12), but another computer may require time and location to be defined with 5 decimals points (e.g. 10.12345). If data is transmitted in a format which a computer cannot interpret, the computer will not be able to process that data and the railway system will not operate.

Locomotives have many elements that are required by an operator of the railway system. Each of those elements have attributes. The attributes may be fixed or dynamic. Fixed attributes may include, for example, the date on which locomotive was manufactured (e.g. 1 Jan. 2000), whether it has driver cockpits at each end, and the power characteristics of the locomotive. Dynamic attributes may include, for example, the fuel level, oil temperature, speed, and location. Those attributes form the content of a message about the locomotive. However, the computer recipient may only be programmed to interpret a subset of the attributes in the message.

A universal means of interpreting the data for any particular computer railway control system is required.

The object of the invention is to transmit data for railway computer control systems in one format and have all recipient computing devices interpret that data correctly.

SUMMARY OF INVENTION

According to a first aspect of the present invention, there is a provided a train control operation system, the system comprising:
 (a) a data collection server for collecting data relating to one or more elements of trains;
 (b) a network for distributing data relating to the elements to subscribers; and
 (c) a subscription server for hosting definitions of elements which is accessible by subscribers to the system, so as to enable subscribers to access the definitions from a single source.

The subscription server and the data collection server can run as separate processes on a single server. The data collection server may represent a number of different servers each collecting different types of data relating to trains.

According to a second aspect of the present invention, there is a provided a mark-up language for a train control operation system, the system comprising:
 (a) a schema for different data elements relating to trains;
 (b) a description of the allowable attributes for each element; and
 (c) rules for formatting the attributes of each element.

The schema file may be a well formed XML document. The schema can be hosted on a server which is accessible by subscribers of the system. Preferably, the server is accessible via a web-based Uniform Resource Locator.

BRIEF DESCRIPTION OF DRAWINGS

Various embodiments of the invention will be described with reference to the following drawing, in which:

FIG. 1 is a schematic representation of a railway control system utilising the present invention.

DETAILED DESCRIPTION

FIG. 1 shows an exemplary railway control system 10 implementing the present invention. The railway control system may be used to track the positions of one or more locomotives, such as locomotives 12 and 14. The locomotives 12 and 14 may be fitted with GPS tracking devices (not shown). In this exemplary embodiment of the system, GPS Satellites 16 transmit a signal to the GPS tracking device which then relays the location data of the locomotives to either the receiving satellite 18, or a GSM-R antenna tower 20 or a public mobile 3G antenna tower 22, for example. The antenna towers 20 and 22 then relay the information to a first position collection server 24.

The server 24 may be located in a control centre operated in one state (e.g. New South Wales), for instance. The data relating to the position of the locomotives 12 and 14 can then be relayed to an adjacent operator 26, who may be in a different location or indeed state (e.g. Queensland), for instance. Both operators may need to exchange data about the location of their locomotives (which may cross each other's borders), so as to avoid collisions. There could be hundreds of computers connected in a network operating the railway control system.

Each of those computers may need to display different data about each of the locomotives. For example, screen 28 in FIG. 1 shows data for a timetable tracking system, screen

30 shows location tracking data (e.g. in a similar manner to Google Maps™), screen 32 shows train orders control data, and screen 34 shows train radio communication data (i.e. the position of radios on locomotives on a rail network, where each line on the screen is a linear representation of a railway line).

The train position data is transmitted in the form of a message 36 (see FIG. 1). The content of message 36 is as follows:

```
<Vehicle>
    <ID> RLS4537 </ID>
    <Time>2014-04-12 19:50:23 </Time>
    <Type>SC3T</Type>
    <Loc>
        <Lat>-31.4564</Lat>
        <Lon>151.242</Lon>
    </Loc>
</Vehicle>
```

The "Vehicle" message 36 shown above begins with the code "<Vehicle>" and ends with the code "</Vehicle>", where the symbols "</>" designate the end of a line of code.

The items above represented in brackets "< >" are referred to as "tags." Each line of code in the message is referred to as an "element." The items between the arrows "<" and ">" are referred to as "attributes."

The ID number "RLS4537" represents the identification number of a GPS receiver on locomotive 12. The time element "2014-04-12 19:50:23" represents the time when the locomotive was at -31.4564 latitude and 151.242 longitude.

The system utilises a schema which defines the possible elements in a message. The schema file is referred to as a Document Type Definition ("DTD") file.

For example, the schema for the message 36 allows attributes to be input for the vehicle including <ID>, <Time>, <Type>, <Loc(ation)>. The system enables any attributes to be inserted in the elements provided in the schema. For example, the element <fuel level> could be added to the schema, as long as the "fuel level" element is defined in the DTD. An extensive list of sample attributes which could be included in a schema for a train control operation system is set out in Appendix 1.

An example section of data in a DTD file is as follows:

```
<!ELEMENT Engine (EngineClass, EngineNumber, PositionOnTrain,
EngineType, Location, Location, Weight, WorkingMode, Fuel?,
MobilePhone?, Driver?, Driver?)>
<!ELEMENT EngineClass    (#PCDATA)>
<!ELEMENT EngineNumber   (#PCDATA)>
<!ELEMENT PositionOnTrain (#PCDATA)>
<!ELEMENT EngineType     (#PCDATA)>
<!ELEMENT WorkingMode    (#PCDATA)>
<!ELEMENT Fuel           (#PCDATA)>
<!ELEMENT MobilePhone    (#PCDATA)>
<!ELEMENT Driver (Name,Location?,Time24hr?)>
<!ELEMENT Name (#PCDATA)>
```

The first section of code written above defines the elements which are used in the DTD file. These elements include the locomotive attributes "Engine Class", "Engine Number", "Position on Train", "Engine Type", "Origin", "Planned Destination", "Gross Mass", "Working Mode", "Fuel (Liters)", "Mobile Phone Number", "Driver (name)", "Second Person (second driver)."

The schema may have hierarchy of levels. For example, the element "Driver" is a sub-schema relating to the driver's name, the depot he is from, and the time he went on duty. The element "Engine" has a sub-element "Driver".

The DTD file has to be a well formed XML document (i.e. the DTD file must comply with the standard XML formatting rules).

The DTD file is hosted on a subscription server 38. There are three primary methods in which the DTD file (describing the various schema) can be accessed by subscribers in the rail network control system from the subscription server 38. A first method is to host the DTD data on web-based Uniform Resource Locator (URL) such as www.4tel.com.au/rsml.dtd. A second method is to store the DTD locally on the receiving computer such as C://location/DTD/rsml.dtd. A third method is to embed the DTD in a message header format (i.e. within the message file itself).

The computers receiving data (shown as screens 28, 30, 32 and 34) need to access the DTD to identify new elements. The position collection server 24 generating the data also needs to access the DTD so that it can populate the attributes which are then distributed to the subscribers.

A new element may be added to the DTD file at any time (e.g. a "fuel level" element). The data in the message 36 is sent to each of the subscribers of the subscription server (e.g. shown on screens 28, 30, 32 and 34). If the application running on the subscriber's computer does not recognise the fuel level element, then it can access the DTD file to identify the attributes of that element and then process that element.

In prior art systems, if new data relating to the operation of rail network needs to be sent to subscribers of the system, the conventional method of distributing that data is to relay it individually to each end subscriber. The disadvantage of this linear form of communication is that each subscriber may receive different data, or data in a different format specified for their particular computer interface. This approach is not readily scalable if new subscribers wish to access the system.

By contrast, the present invention directs each end subscriber to a single location in which they can access the data on a single subscription server. This provides a universal and uniform source of understanding the data stream across the networks. The present invention has a one-to-many distribution architecture that presents, in effect, zero marginal cost to add a new marginal subscriber.

In compliance with the statute, the invention has been described in language more or less specific to structural or methodical features. It is to be understood that the invention is not limited to specific features shown or described since the means herein described comprises preferred forms of putting the invention into effect. The particular features, structures, or characteristics of the invention may be combined in any suitable manner in one or more combinations. The invention is, therefore, claimed in any of its forms or modifications within the proper scope of the appended claims (if any) appropriately interpreted by those skilled in the art.

APPENDIX 1

| Element/Attribute Name | Description | Data Type | Size and format | Units | Accuracy | Constraints |
|---|---|---|---|---|---|---|
| ArrivalCode | Security (arrival) code for the location at the limit of the Train Order | Text | 4 Alpha Numeric characters | — | — | — |
| Authority | The authority responsible for the RSML | Text | 1-20 chars | — | — | — |
| Consignee | Receiver of the consignment | Text | List of values (2-3 chars) | — | — | — |
| Container Count | Number of containers on the vehicle. | Integer | 1 digit | — | — | — |
| Contents | Commodity of the consignment. | Text | List of values (3-4 chars) | — | — | — |
| Count | Number of vehicles excluding working engines. | Integer | 1-5 digits | — | — | — |
| Date | Date | Y2K DMY | DD/MM/YYYY (eg 05/11/1998) | — | — | — |
| Departure Code | The security (departure) code for the location from where the train is authorised to depart. | Text | 4 AlphaNumeric characters | — | — | — |
| Description | Description | Text | 1-30 chars | — | — | — |
| DGClass | Dangerous goods code. | Text | List of values (1-3 chars) | — | — | — |
| DrawGear Capacity | Draw gear capacity. | Float | 1-6 digits total | — | 1 decimal place | — |
| EmpNumber | Employee No | Integer | 1-7 digits | — | — | — |
| EngineClass | Check letter of the vehicle. | Text | List of values (1 char) | — | — | — |
| EngineNo | Lead locomotive number of the train for which the Train Order is being issued. | Integer | 5 digits OR select from list | — | — | — |
| Engine Number | Number of the vehicle. | Integer | 1-10 digits | — | — | — |
| EngineType | Class of the vehicle. | Text | List of values (1-4 chars) | — | — | — |
| FlagfallType | 'Priority' on which the flagfall component of the access charges will be based - (P)remium, (H)igh, (S)tandard, (L)ow. | Text | List of values (1 char) i.e. P, H, S, L | — | — | — |
| Fuel | Fuel | Integer | 1-5 digits | Litres | — | — |
| Fulfilment Code | Security (fulfilment) code provided by the train controller. | Text | 4 AlphaNumeric characters | — | — | — |
| Hpt | Horsepower per tonne. | Float | 1-10 digits | Hp/t | 0-7 decimals | — |
| IntSpeed | Restricted FRT Speed | Integer | 1-5 digits | Kilometres | — | — |
| KgeLocation | To/From Kilometrage | Integer | 6 digits | Kilometres | — | — |
| Length | Length (in metres) of the vehicle | Float | 1-6 digits | Metres | 0-3 decimals | — |
| Location | Place, station, town | Text | List of values (3 chars) | — | — | — |
| MobilePhone | Mobile phone number. | Mixed | 9-15 digits (spaces allowed) | — | — | — |
| Month | Month | Integer | 1-2 digits | — | — | — |
| MsgContent | Comments related to this Train Notice | Text | Free Text | — | — | — |
| Name | Driver name | Text | 1-40 chars | — | — | — |
| NoticeID | Train Notice Number | Integer | 1-5 digits | — | — | — |
| Operator | Code which identifies the company operating the train | Integer | List of values (2-3 chars) | — | — | — |
| OrderNo | Number provided by the train controller - generated by the computer on a weekly basis | Integer | 1-5 digits | — | — | — |
| OrderType | Type order applicable - Train, Mishap or Shunt | Text | List of values eg "TRAIN" - select from list | — | — | — |
| Organisation | Organisation | Text | 1-25 chars | — | — | — |
| Packaging | Refer to the goods being (P)ackaged or in | Text | List of values (1 char) i.e. P, B | — | — | — |

APPENDIX 1-continued

| Element/ Attribute Name | Description | Data Type | Size and format | Units | Accuracy | Constraints |
|---|---|---|---|---|---|---|
| | (B)ulk. | | | | | |
| PositionOn Train | Position of the vehicle on the train. | Integer | 1-2 digits | — | — | — |
| Preference | Preferential handling - identification of the urgency for handling/ processing | Alpha | 1-9 chars | — | — | — |
| Priority | Train priority. | Text | List of values (MANDATORY/ CONDITIONAL/ UN-PLANNED CONDITIONAL) | — | — | — |
| Sender | Sender of the consignment. | Text | List of values (2-3 chars) | — | — | — |
| Sequence Number | The sequence number of the RSML (with respect to the originating system) sent for the given date (resets each 24 hour period) | Integer | 1-6 digits | — | — | — |
| ShuntAccess | Is shunt access authorised at this location? | Text | List of values (YES or NO) | — | — | — |
| SpecialInstr | Special instructions for this section, such as particulars of a crossing movement | Text | Free Text | — | — | — |
| SpeedStatus | Speed Status | Text | List of values (PLACED/ MODIFIED/ LIFTED/ REPLACED) | — | — | — |
| Status | Indicates whether the train is (P)lanned to run but not yet departed, (R)unning, (A)rrived, (C)ancelled or (T)erminated short of its destination. | Text | List of values (1 char) i.e. P, R, A, C, T | — | — | — |
| SystemID | The system identifier | Text | 1-50 chars | — | — | — |
| Time24 hr | The time at which an event occurred. | 24 Hr Time | HH:MM time (eg 10:20) | — | — | — |
| Title | Title | Text | 1-35 Alpha Numeric characters | — | — | — |
| Track Direction | Track Direction | Text | List of values (UPTRACK/ DOWNTRACK/ BOTH) | — | — | — |
| TrackType | Where train will be standing on. Eg: Loop, etc... | Text | List of values Eg "Loop" - select from list | — | — | — |
| TrainNo | Number of the train for which the Train Order is being issued | Text | List of values (1 char 3 digits) eg 1974 | — | — | — |
| TrainNumber | Train identifier. | Text | 1-5 chars | — | — | — |
| TrainType | Code which identifies the type of train. | Text | List of values (2 chars) | — | — | — |
| Type | Train Notice Type | Text | 1 Alpha char (D)aily, (T)emporary Standard, (S)tandard | — | — | — |
| UNNumber | UN number. | Mixed | "UN" + 4 digits | — | — | — |
| UserID | ID of user issuing this Train Notice | Text | 1-12 Alpha Numeric Characters | — | — | — |
| Version | The relevant DTD version number | Float | 3-4 digits | — | 2 decimals | — |
| WagonClass | Check letter of the vehicle. | Text | List of values (1 char) | — | — | — |
| Wagon Number | Number of the vehicle. | Integer | List of values (1-10 digits) | — | — | — |
| WagonType | Class of the vehicle. | Text | List of values (1- | — | — | — |

APPENDIX 1-continued

| Element/Attribute Name | Description | Data Type | Size and format | Units | Accuracy | Constraints |
|---|---|---|---|---|---|---|
| Weight | Gross mass of the vehicle | Float | 4 chars) 1-8 digits | Tonnes | 0-4 decimals | — |
| Working Mode | Indicates if the vehicle is a (W)orking engine, (A)ssisting engine, (F)ailed engine or a (H)auled vehicle. | Text | List of values (1 char) i.e. W, A, F, H | — | — | — |
| Year | Year | Integer | 4 digits | — | — | — |

The invention claimed is:

1. A train control system having computer components, the system comprising:
   (a) a plurality of active trains;
   (b) a schema defining different data elements relating to trains, the data elements comprising attributes specific to the active trains, the schema comprising a universal mark-up language interface;
   (c) a description of the allowable attributes for each data element;
   (d) rules for formatting the attributes of each data element; and
   (e) a data network for connecting the component computers, the component computers adapted to communicate via the universal mark-up language;
   wherein the schema, description and rules are accessible by all of the component computers via the data network and real-time insertion of new data elements into the schema by any of the component computers during operation of the train system in response to changing conditions specific to an active train is permitted, and
   wherein responsive to a data error in a message transmitted between component computers via the data network, each component computer is adapted to access the schema to identify the attributes of at least one unrecognized data element in the message before processing the at least one unrecognized data element and controlling one or more active trains based on the processed data.

2. The system of claim 1, wherein the component computers include:
   (a) data monitoring computers for collecting data elements of trains;
   (b) subscriber computers for accessing the train control system; and
   (c) a subscription computer for hosting the schema which is accessible by the component computers via the network, so as to enable each subscriber computer to access the schema from the data monitoring components.

3. The system of claim 2, wherein the data monitoring computer may represent a number of different component computers each monitoring different types of data elements for trains.

4. The system of claim 3, wherein a computer becomes a component of the system by accessing the schema on the subscription computer.

5. The system of claim 4, wherein the schema is an XML document.

6. The system of claim 3, wherein the schema is an XML document.

7. The system of claim 2, wherein a computer becomes a component of the system by accessing the schema on the subscription computer.

8. The system of claim 7, wherein the schema is an XML document.

9. The system of claim 2, wherein the schema is an XML document.

10. The system of claim 1, wherein a computer becomes a component of the system by accessing the schema on the subscription computer.

11. The system of claim 10, wherein the schema is an XML document.

12. The system of claim 1, wherein the schema is an XML document.

13. A method for operating a train control system having component computers, the train control system comprising a plurality of active trains and a data network for connecting the component computers, the component computers adapted to communicate via the data network, the method comprising:
   defining a schema of different data elements comprising: attributes specific to the active trains, a description of the allowable attributes for each data element, and rules for formatting the attributes of each data element, the schema comprising a universal mark-up language interface;
   hosting the schema on a subscription computer which is accessible by the component computers via the data network;
   permitting real-time insertion of new data elements into the schema by any of the component computers during operation of the train system in response to changing conditions specific to an active train;
   transmitting a message comprising at least one data element between component computers via the data network;
   responsive to at least one component computer not recognizing one or more of the transmitted data elements, accessing the schema by the at least one component computer to identify the attributes of the one or more unrecognized data elements;
   processing the at least one data element by the at least one component computer; and
   controlling at least one active train based on the processed data.

14. The method of claim 13 wherein the train control system component computers further comprise data monitoring computers for collecting data elements of trains and subscriber computers for accessing the train control system, and the method further comprises the step of:

collecting data elements of trains by the data monitoring computers for transmission between subscriber computers via the data network.

15. The method of claim 14, wherein the data monitoring computers may represent a number of different component computers each monitoring different types of data elements for trains.

16. The method of claim 13, wherein a computer becomes a component of the train control system by accessing the schema on the subscription computer.

17. The method of claim 13, wherein the schema is an XML document.

* * * * *